(12) United States Patent
Suneya

(10) Patent No.: US 10,447,680 B2
(45) Date of Patent: Oct. 15, 2019

(54) COMMUNICATION CONTROL APPARATUS, COMMUNICATION CONTROL METHOD, AND RECORDING MEDIUM

(71) Applicant: CANON KABUSHIKI KAISHA, Tokyo (JP)

(72) Inventor: Toru Suneya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/837,510

(22) Filed: Dec. 11, 2017

(65) Prior Publication Data

US 2018/0103027 A1  Apr. 12, 2018

Related U.S. Application Data

(63) Continuation of application No. 14/551,704, filed on Nov. 24, 2014, now Pat. No. 9,866,541.

(30) Foreign Application Priority Data

Nov. 27, 2013  (JP) .................................. 2013-245196

(51) Int. Cl.
  *H04L 29/06* (2006.01)
(52) U.S. Cl.
  CPC ............ *H04L 63/08* (2013.01); *H04L 63/168* (2013.01); *H04L 65/1069* (2013.01); *H04L 65/608* (2013.01)
(58) Field of Classification Search
  CPC ...................................................... H04L 63/08
  USPC .......................................................... 726/3
  See application file for complete search history.

(56) References Cited

U.S. PATENT DOCUMENTS

| 2006/0025168 A1* | 2/2006 | Lee ....................... H04W 84/08 455/518 |
| 2006/0259949 A1* | 11/2006 | Schaefer ............. H04L 63/0428 726/1 |
| 2009/0185040 A1* | 7/2009 | Yang ................... H04L 65/4092 348/207.11 |
| 2010/0058064 A1* | 3/2010 | Kirovski ............... H04L 9/3073 713/176 |

* cited by examiner

*Primary Examiner* — Jacob Lipman
(74) *Attorney, Agent, or Firm* — Canon U.S.A., Inc. IP Division

(57) ABSTRACT

A communication unit and a controller are included, the communication unit being configured to communicate with a communication apparatus using a first communication procedure in which authentication of the communication apparatus is performed in order to retain a communication session with the communication apparatus and using a second communication procedure that does not require authentication of the communication apparatus in order to communicate with the communication apparatus, the controller being configured to perform, using the first communication procedure and the second communication procedure, control under which it is determined whether a communication session with the communication apparatus is to be retained and perform control under which a limit is put on retaining of the communication session with the communication apparatus through the second communication procedure in a case where the communication apparatus is not authenticated as a certain communication apparatus through the first communication procedure.

12 Claims, 6 Drawing Sheets

COMMUNICATION CONTROL APPARATUS, COMMUNICATION CONTROL METHOD, AND RECORDING MEDIUM

CROSS-REFERENCE TO RELATED APPLICATIONS

This application is a continuation of U.S. patent application Ser. No. 14/551,704, filed Nov. 24, 2014, which claims the benefit of Japanese Patent Application No. 2013-245196, filed Nov. 27, 2013, both of which are hereby incorporated by reference herein in their entirety.

BACKGROUND

Technical Field

The following embodiments relate to communication session control between a plurality of apparatuses connected via a network.

Description of the Related Art

In recent years, a technology has become widely commercially available in which multimedia data such as a moving image and audio is distributed and viewed via streaming using a communication protocol called the Real-time Transport Protocol (RTP).

RTP is a protocol for transferring data mainly such as audio or a moving image and is defined as RFC3550 by the Internet Engineering Task Force (IETF).

RTP is an upper layer protocol of the User Datagram Protocol (UDP), which is a connectionless protocol. In the case where communication is performed using RTP by packetizing moving image data or audio data, RTP packets flowing in a network are generally called stream data or a media stream.

As a protocol for performing control using RTP such as for starting or ending a media stream, the Real Time Streaming Protocol (RTSP) is generally known. RTSP is defined as RFC2326 by IETF.

For a communication session controlled by RTSP, in the case where no messages have been transmitted for a predetermined time period from a client that receives stream data to a server, which is a transmission source, it may be considered that the communication session has timed out and the server may terminate the session.

In the case where the communication session is desired to be continued, the communication session may be continued by sending a message from the server before the predetermined time period elapses. Such a system for continuing a communication session is also called a "keepalive".

In RTSP, when a communication session is started, a server notifies a client of a time period after which a communication session times out (hereinafter referred to as a timeout time period). The client may cause the transmission session to be continued by transmitting an arbitrary RTSP command to the server before the timeout time period elapses.

PCT Japanese Translation Patent Publication No. 2005-526294 has disclosed, as a way in which a communication session is continued, a communication system using a protocol called the Real-Time Transport Control Protocol (RTCP) in addition to RTSP.

RTCP is used in combination with RTP. RTCP is a protocol for performing flow control or transferring information between a sender and a receiver, and is defined as RFC3550 by IETF.

In RTCP, in order that a client side notifies a server side of the status of communication, a type of packets called receiver report (hereinafter referred to as RR) is used.

Hitherto it has been known a method for causing a server to continue a communication session through periodic notification of an RR packet from a client to a server.

However, in the case where a communication session is managed using a plurality of communication procedures (communication protocols), a communication session with a client that is not authenticated by a server may be established or continued.

For example, in the case where a first protocol that supports a client authentication function and a second protocol that does not support the client authentication function are used together, the following issues arise, the client authentication function being a function through which authentication of a client is performed. That is, a communication session with a client that is not authenticated by a server may be established or continued.

For example, when a communication session is established or retained between a server and a client, RTSP supports the client authentication function performed by the server.

In contrast, RTCP does not support the client authentication function, which is performed by a server. Thus, in the case where a communication session is continued through periodic notification of an RR packet from a client to a server as in the above-described conventional example, authentication of the client is not required.

Thus, as a result of authentication of a client in communication using RTSP, even though it is determined by the server that a communication session is not continued with the client, communication may be continued with the client through communication using RTCP.

In this manner, there may be the case where secure communication is not possible.

According to the following embodiments, more secure communication session control may be realized.

SUMMARY

A communication control apparatus according to the following embodiments has the following configuration.

That is, a communication unit and a controller are included, the communication unit being configured to communicate with a communication apparatus using a first communication procedure in which authentication of the communication apparatus is performed in order to retain a communication session with the communication apparatus and using a second communication procedure that does not require authentication of the communication apparatus in order to communicate with the communication apparatus, the controller being configured to perform, using the first communication procedure and the second communication procedure, control under which it is determined whether a communication session with the communication apparatus is to be retained and perform control under which a limit is put on retaining of the communication session with the communication apparatus through the second communication procedure in a case where the communication apparatus is not authenticated as a certain communication apparatus through the first communication procedure.

Further features of the present invention will become apparent from the following description of exemplary embodiments with reference to the attached drawings.

DESCRIPTION OF THE EMBODIMENTS

In the following, a detailed description will be made in accordance with embodiments with reference to the attached drawings. Note that configurations illustrated in the following embodiments are mere examples and the present invention is not limited to the illustrated configurations.

<First Embodiment>

Figure 1:
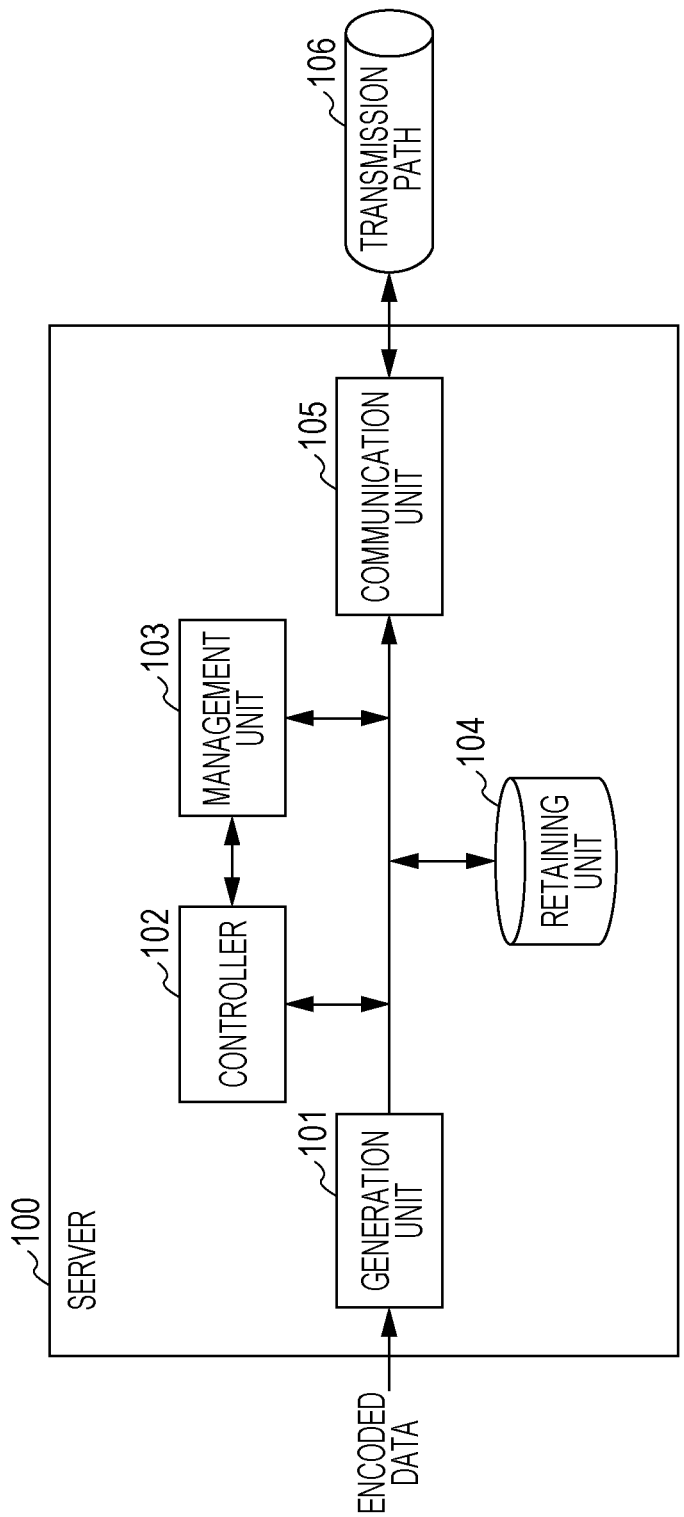
FIG. 1 is a diagram illustrating the configuration of a server.

FIG. 1 illustrates an example of a communication control apparatus, which is an embodiment of the present invention. FIG. 1 is a block diagram illustrating an example of the configuration of a server 100 (a communication control apparatus) according to a first embodiment of the present invention.

The server 100 may be, for example, a transmission apparatus that transmits video data to a client such as a personal computer (PC) and a tablet device. Alternatively, the server 100 may be a network camera having an image capturing unit that performs imaging. In the case where a network camera has the function of the server 100, video data captured by the image capturing unit may also be transmitted to a client such as a PC and a tablet device.

In FIG. 1, the server 100 includes a generation unit 101, a controller 102, a management unit 103, a retaining unit 104, and a communication unit 105.

A transmission path 106 is mobile phone communication service such as so-called 3G and 4G, the Internet, or a network such as a local area network (LAN).

The communication unit 105 has a function for transmitting and receiving data and is connected to the transmission path 106 so as to be able to perform communication. Note that communication may be performed in a wireless manner and also in a wired manner.

The communication unit 105 may establish a communication session with a communication apparatus (hereinafter referred to as a "client") using a first communication procedure, which is a communication procedure for performing authentication of a client so as to retain a communication session with the client. In addition, the communication unit 105 may communicate with a client using a second communication procedure, which is a communication procedure that does not require authentication of a client in order to communicate with the client.

In the first embodiment, the communication unit 105 may communicate with a client through RTSP (the first communication procedure). In addition, in the first embodiment, the communication unit 105 may communicate with a client through RTCP (the second communication procedure).

Here, a communication session is established between the server 100 and a client in communication using RTSP. The client may perform, to the server 100, an operation such as playback, pause, or stop on a video transmitted from the server 100 using a procedure defined by RTSP (the first communication procedure). For example, in the case where the server 100 is a network camera, the client may, for example, pause, restart, and stop transmission of a video captured by the network camera using a procedure defined by RTSP.

In the first embodiment, a communication session is a session used to control video transmission of the server 100 using the first communication procedure. In the first embodiment, when a communication session is terminated, video streaming from the server 100 to a client is also terminated. Alternatively, even in the case where a communication session used to control video transmission of the server 100 using the first communication procedure has been terminated, video streaming may be continued.

When a communication session is established and retained between the server 100 and a client in communication using RTSP, the server 100 may perform authentication of the client.

In communication using RTSP, the server 100 receives first data (for example, a first RTSP command) and then second data (for example, a second RTSP command) from a client. The first RTSP command and the second RTSP command may be, for example, GET_PARAMETER commands.

In the case where the server 100 receives the second data before a first predetermined time period elapses after reception of the first data and where the client that has transmitted the second data has been authenticated as a certain client, a communication session with the client is retained. The first predetermined time period is a timeout time period.

In addition, in communication using RTCP, a communication session is not established between the server 100 and a client. In the first embodiment, the case will be described where an RTCP communication procedure is used to retain an established communication session. Using the procedure defined by RTCP, a client writes a reception status of data transmitted from the server 100 in an RR packet and notifies the server 100 of the RR packet. In the RR packet, for example, information on the number of lost packets, jitter of a packet arriving time, and the like is written.

The server 100 according to the first embodiment updates the timeout time of a communication session established using RTSP every time an RR packet is received.

For example, in communication using RTCP, the server 100 receives third data (for example, a first RTCP RR packet) from a client and then fourth data (for example, a second RTCP RR packet).

In communication using RTCP, in the case where the server 100 receives the fourth data before a second predetermined time period elapses after reception of the third data, a communication session established through an RTSP communication procedure is retained.

The server 100 according to the first embodiment determines whether or not a communication session established using RTSP is retained, in accordance with reception of an RTSP command and reception of an RR packet. Thus, even in the case where a client apparatus determines, using only one of the RTSP command and the RR packet, whether or not a communication session is to be retained, the server 100 according to the first embodiment may retain the communication session appropriately.

In the case where, for example, RTP is used, the generation unit 101 divides data obtained by encoding a moving image or audio input from the outside into pieces of data having a size appropriate for communication and generates RTP data packets by further adding, for each type of medium, a header appropriate for the type of medium.

The controller 102 controls elements of the server 100. The controller 102 sends commands regarding generation and termination of a communication session with a client. In addition, the controller 102 performs flow control on data to be transmitted from the server 100 to a client.

In the first embodiment, the controller 102 performs control under which it is determined whether a communication session with a communication apparatus is to be retained, using the first communication procedure (for example, RTSP) and the second communication procedure (for example, RTCP). In addition, in the case where a client is not authenticated as a certain client through the first communication procedure, the controller 102 performs the following control. That is, control is performed under which a limit is put on retaining of a communication session with the client through the second communication procedure.

The controller 102 may be, for example, a processor such as a central processing unit (CPU). In the case where the controller 102 is configured as a processor, for example, the controller 102 controls the elements of the server 100 by executing a program stored in the retaining unit 104, which will be described later.

The management unit 103 causes the retaining unit 104, which will be described later, to retain the content of data transmitted from a client for which a communication session has been generated to the server 100 and the time at which the data has been received. The management unit 103 may also cause the retaining unit 104 to retain the time at which the data has been transmitted from the client together with the data transmitted from the client. In addition, the management unit 103 performs management of information on retaining of a communication session with a client in accordance with information stored in the retaining unit 104.

The retaining unit 104 retains the content of data received from a client. In addition, the retaining unit 104 retains information on the time at which the server 100 has received the data transmitted from the client or the time at which the data has been transmitted from the client. In the first embodiment, the time retained in the retaining unit 104 is the time at which measurement of timeout time period is started for a communication session. For example, in the case where the timeout time period is 60 seconds, when 60 seconds elapse from the time retained in the retaining unit 104, the server 100 terminates a communication session with a client.

Figure 2:
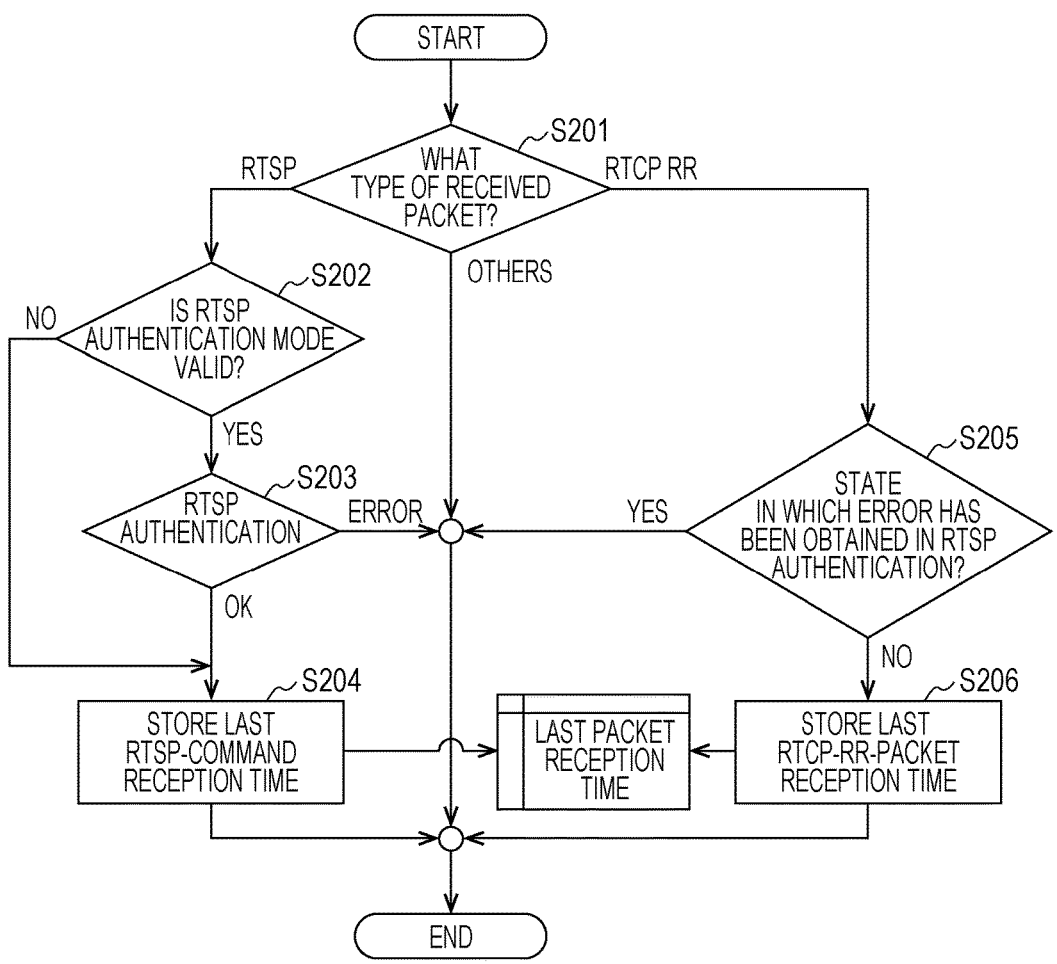
FIG. 2 is a flowchart illustrating an example of a process for storing a timeout time period for a communication session in the server.
Figure 3:
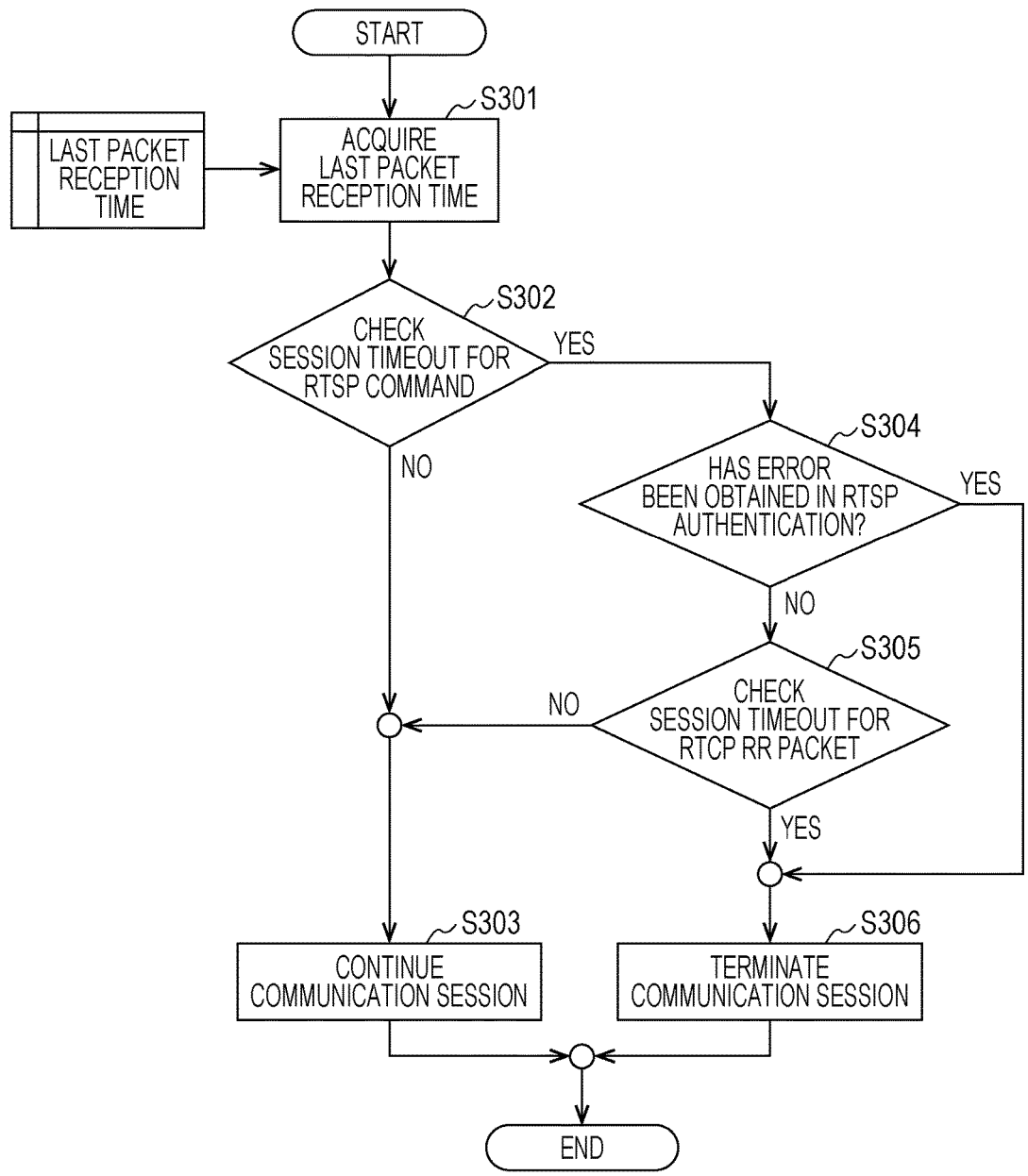
FIG. 3 is a flowchart illustrating an example of a determination process as to whether a communication session is continued or terminated in the server.

Next, details of communication session control to be performed by the server 100 of the first embodiment will be described using FIGS. 2 and 3. FIGS. 2 and 3 are flowcharts illustrating an example of communication session control in the server 100 of the first embodiment.

In an example in which the controller 102 of the server 100 includes a processor and a memory, the processes illustrated in FIGS. 2 and 3 are realized by the controller 102 executing steps illustrated in FIGS. 2 and 3, the steps being executed by expanding a program stored in the retaining unit 104 in a memory and executing the program. The server 100 serves as elements that realize the respective steps by executing the steps. Alternatively, some of or all the processes illustrated in FIGS. 2 and 3 may be performed by a hardware device.

An example of a process in which, when packets are received from a client, the server 100 stores a last packet reception time will be described using FIG. 2.

In FIG. 2, first, the controller 102 determines the type of a packet received by the communication unit 105 (S201). In the case where the packet is an RTSP command, the process proceeds to step S202, and in the case where the packet is an RTCP RR packet, the process proceeds to step S205.

Here, an RTSP command is a command transmitted from a client to the server 100 in communication using RTSP.

In addition, an RTCP RR packet is a packet transmitted from a client to the server 100 in communication using RTCP. A client may cause the server 100 to continue a communication session by notifying the server 100 of an RTCP RR packet before the timeout time period of the communication session elapses, the server notifying the client of the timeout time period.

Determination performed by the controller 102 in step S201 is not limited to the above-described example as long as it is determined whether or not data received by the communication unit 105 is data transmitted using a communication procedure in which authentication of the client is performed.

In the case where the packet received by the communication unit 105 is an RTSP command (RTSP in S201), the controller 102 determines whether or not an RTSP authentication mode is valid (S202). Here, the RTSP authentication mode is a mode for determining whether or not a client that has accessed the server 100 is a client for which a communication session with the server 100 is allowed to be established, through the RTSP communication procedure. As an authentication method, for example, DIGEST authentication or BASIC authentication may be used. The setting as to whether the RTSP authentication mode is valid or invalid is retained in the retaining unit 104. The authentication mode may also be changed from valid to invalid and vice versa by a command sent to the server 100 by a client.

In the case where the RTSP authentication mode is valid (Yes in S202), the controller 102 executes RTSP authentication and determines whether or not the client is a client for which a communication session with the server 100 is allowed to be established (S203). In the case where the client has been authenticated in step S203 (OK in S203), the controller 102 performs processing in step S204. In contrast, in the case where the client has not been authenticated in step S203 (Error in S203), the controller 102 terminates the process.

In the case where the client has not been authenticated as a certain client in step S203, the server 100 causes the retaining unit 104 to retain information regarding a state in which RTSP authentication has failed. Alternatively, the server 100 may also cause the retaining unit 104 to retain information regarding a state in which RTSP authentication has succeeded.

In addition, in the case where the RTSP authentication mode is invalid in step S202 (No in step S202), the controller 102 does not perform RTSP authentication and performs processing in step S204.

In step S204, the controller 102 controls the management unit 103 and causes the retaining unit 104 to retain, for each communication session, the time at which an RTSP command has been last received (a last reception time) and ends the process. A certain timeout time period (for example, 60 seconds) is measured from the last reception time retained in the retaining unit 104 for the RTSP command. In the case where a new RTSP command has been received within the timeout time period and where RTSP authentication of the client has succeeded, the server 100 determines to retain the communication session.

In contrast, in the case where the type of the received packet is determined to be RTCP RR in step S201, the controller 102 performs processing in step S205.

In the case where the packet received by the communication unit 105 is an RTCP command (RTCP RR in S201), the controller 102 checks, in step S205, whether or not the communication session at that point in time is in the state in which RTSP authentication has failed. In the case of the state in which RTSP authentication has failed (Yes in step S205), the controller 102 terminates the process. Information regarding the state in which RTSP authentication has failed is retained in the retaining unit 104.

In contrast, in the case where RTSP authentication has succeeded or where RTSP authentication is invalid (No in step S205), the controller 102 performs processing in step S206. Information regarding the state in which RTSP authentication has succeeded or RTSP authentication being invalid is retained in the retaining unit 104.

In step S206, the controller 102 controls the management unit 103 and causes the retaining unit 104 to retain, for each communication session, the time at which an RTCP RR packet has been last received (a last reception time). A certain timeout time period (for example, 60 seconds) is measured from the last reception time retained in the retaining unit 104 for the RR packet. In the case where a new RR packet is received within the timeout time period, the server 100 determines to retain the communication session.

The following process may be performed in accordance with the flowchart described above and illustrated in FIG. 2.

That is, the case where the first data (an RTSP command) has been received from the client using the first communication procedure (RTSP) is called a first case (RTSP in S201). In addition, the case where the client that has transmitted the first data has been authenticated as a certain communication apparatus is called a second case (Yes in S203). In the case of the first and second cases, the time at which the first data has been received is retained in the retaining unit 104.

Furthermore, the case where the first data has been received from the client using the first communication procedure and where the client is not authenticated as a certain communication apparatus, the time at which the first data has been received is not retained in the retaining unit 104. (RTSP in S201 and Error in S203).

In the case where the time at which the RTSP command (the first data) has been received is not retained in the retaining unit 104, even though a new RTSP command is received, the time at which measurement of timeout time period is started is not updated. Thus, because of a session timeout, the communication session with the client is no longer retained.

In addition, the following process may be performed in accordance with the flowchart illustrated in FIG. 2.

That is, the case where the third data (an RR packet) has been received from the client using the second communication procedure (RTCP) is called a third case (RTCP RR in S201). In addition, the case where the client is in a state in which the client is authenticated as a certain communication apparatus through the first communication procedure is called a fourth case (No in S205). In the case of the third and fourth cases, the time at which the third data has been received is retained in the retaining unit 104.

Furthermore, in the case where the third data has been received from the client using the second communication procedure and where the client is in a state in which the client is not authenticated as a certain communication apparatus through the first communication procedure, the time at which the third data has been received is not retained in the retaining unit 104. (RTCP RR in S201 and Yes in S205).

In the case where the time at which the RR packet (the third data) has been received is not retained in the retaining unit 104, even though a new RR packet is received, the time at which measurement of timeout time period is started is not updated. Thus, because of a session timeout, the communication session with the client is no longer retained.

The process described using FIG. 2 is executed, for each communication session, every time a packet transmitted from the client is received by the communication unit 105. In steps S204 and S206, every time the process described using FIG. 2 is repeated, the time retained in the retaining unit 104 is updated.

Next, on the basis of the last packet reception time stored by performing the process described using FIG. 2 and the timeout time period of the communication session, an example of a process as to whether the communication session is to be retained or terminated will be described using FIG. 3. The controller 102 executes the process of FIG. 3 periodically (for example, every two seconds).

First, the controller 102 acquires the time at which an RTSP command has been last received and the time at which an RTCP RR packet has been last received, from the retaining unit 104 (S301).

Next, the controller 102 compares the elapsed time period from the time at which the RTSP command has been last received to the current time with the timeout time period of the communication session and checks whether to cause the communication session, which has been established using RTSP, to time out (S302).

In the case where the elapsed time period does not exceed the timeout time period in communication using RTSP (No in S302), the controller 102 executes processing in step S303. That is, the communication session with the client is continued (S303).

In the case where the elapsed time period exceeds the timeout time period in communication using RTSP (Yes in S302), the controller 102 executes processing in step S304.

In step S304, the controller 102 checks whether or not the communication session is in the state in which RTSP authentication has failed. In the case where the communication session is in the state in which RTSP authentication has failed (Yes in S304), the process proceeds to step S306 and the controller 102 performs control for terminating the communication session with the client. In step S306, the controller 102 terminates the communication session with the client.

In step S304, in the case where the communication session is in the state in which RTSP authentication has succeeded and where RTSP authentication is invalid (No in S304), the process proceeds to step S305.

In step S305, the controller 102 compares the elapsed time period from the time at which the RTCP RR packet has been last received to the current time with the timeout time period of the communication session using RTCP and checks whether to cause the communication session to time out.

In the case where the elapsed time period does not exceed the timeout time period (No in S305), the controller 102 executes processing in step S303. That is, the controller 102 continues the communication session with the client (S303).

In the case where the elapsed time period exceeds the timeout time period (Yes in S305), the controller 102 executes processing in step S306. That is, the controller 102 terminates the communication session with the client (S306).

The following process may be performed in accordance with the flowchart described above and illustrated in FIG. 3.

That is, the case where the client that has transmitted the second data (the RTSP command) has been authenticated as a certain client is called a fifth case (Yes in S203). In addition, the case where the second data has been received using the first communication procedure (RTSP) before a predetermined time period elapses from the time retained in the retaining unit 104 is called a sixth case (No in S302). In the case of the fifth and sixth cases, control is performed such that the communication session with the client is retained (S303).

In addition, the following process may be performed in accordance with the flowchart illustrated in FIG. 3.

That is, in the case where the fourth data (the RR packet) has been received using the second communication procedure (RTCP) before the predetermined time period elapses from the time retained in the retaining unit 104, control is performed such that the communication session with the client is retained (No in S305).

The process of FIG. 3 makes it possible to retain a secure communication session by being repeatedly executed, for example, every two to several seconds and causing a communication session to time out at the correct time.

Figure 4:
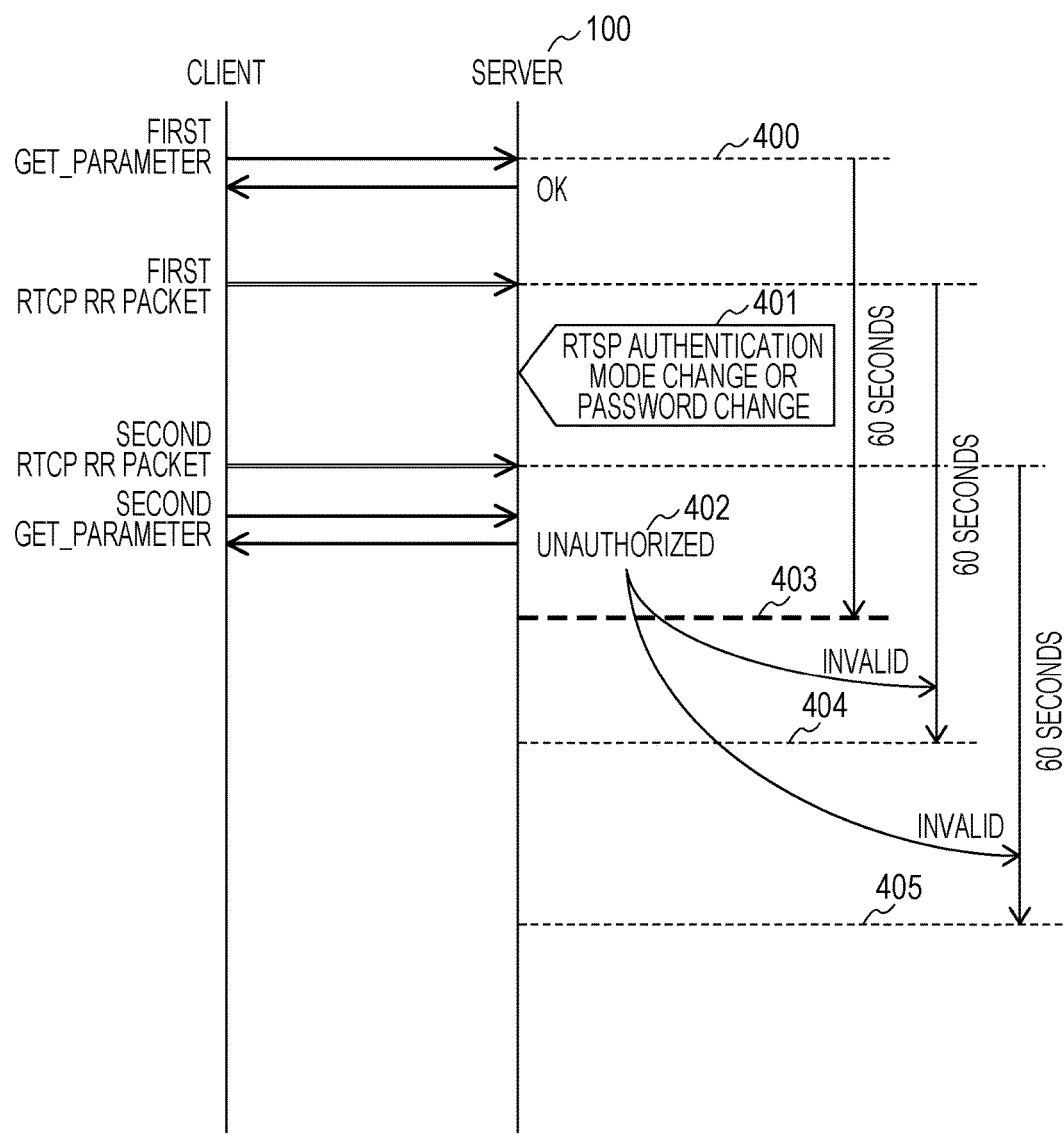
FIG. 4 is a sequence diagram illustrating an example of communication session control in the server according to a first embodiment.

Next, the examples of the flows of the processes described using FIGS. 2 and 3 will be described using sequence diagrams illustrated in FIGS. 4 and 5. FIG. 4 is a sequence diagram illustrating an example of communication session control in the server, which is an embodiment of the present invention.

An example in which the server 100 controls a communication session with a client using RTSP and RTCP will be described using FIG. 4.

In the example illustrated in FIG. 4, upon receiving a GET_PARAMETER before a timeout time period elapses in communication using RTSP, the server 100 continues the communication session, the GET_PARAMETER being one of RTSP commands.

In addition, in the example illustrated in FIG. 4, upon receiving an RR packet before a timeout time period elapses in communication using RTCP, the server 100 continues the communication session.

In the first embodiment, the case will be described where a timeout time period of a communication session after reception of a GET_PARAMETER is 60 seconds. In addition, the case will be described where a timeout time period of a communication session after reception of an RR packet is 60 seconds.

In FIG. 4, a time 403 is a time at which 60 seconds, which are the timeout time period, elapse from a time 400 at which the server 100 has received a first RTSP command (a first GET_PARAMETER) from the client.

In the case where the server 100 has received a second RTSP command before the time 403 and the client that has transmitted the second RTSP command has been authenticated by the server 100, the server 100 continues a communication session with the client.

In contrast, in the case where a second RTSP command (a second GET_PARAMETER) is not received after reception of the first RTSP command and before the time 403 and session retaining is not performed through RR reception, the communication session with the client is terminated. In addition, even in the case where the second RTSP command has been received before the time 403, when the client that has transmitted the second RTSP command is not authenticated by the server 100, the communication session is terminated.

The timeout time period is not limited to 60 seconds. In addition, the timeout time period in communication using RTSP does not have to be the same as the timeout time period in communication using RTCP in terms of length.

A time 404 is a time at which 60 seconds elapse from when the server 100 receives a first RTCP RR packet, the 60 seconds being the timeout time period. In addition, a time 405 is a time at which 60 seconds elapse from when the server 100 receives a second RTCP RR packet from the client, the 60 seconds being the timeout time period.

The server 100 continues a communication session with the client in the case where the server 100 has received the second RTCP RR packet before the time 404 after receiving the first RTCP RR packet.

In contrast, in the case where the server 100 does not receive the second RTCP RR packet before the time 404 and session retaining is not performed in accordance with an RTSP command, the server 100 terminates the communication session with the client. At the time 405, similarly to as for the time 404, it is determined whether or not the communication session with the client is to be continued.

A time 401 is a time at which the client has changed settings such as changing of an RTSP authentication mode, changing of a password, and the like, the time being a time after the time 400 at which the first RTSP command has been received and before the time at which the second RTSP command has been received.

At the time 401 illustrated in FIG. 4, in the case where, for example, the RTSP authentication mode has been changed or the password has been changed in the server 100, there may be the case where RTSP authentication of the client fails that has transmitted the second RTSP command. In such a case, the server 100 returns an error code 402 (Unauthorized) to the client, the error code 402 indicating that the client is not authenticated by the server 100.

In the case where the client has not been authenticated in communication using RTSP (in the case of an authentication error), the server 100 does not continue, after receiving the second RTSP command, the communication session with the client even when the server 100 receives an RTCP RR packet.

For example, continuation of the communication session through reception of an RTCP RR packet from the client is made invalid. That is, the time 405, a timeout time, is made invalid.

In the example of FIG. 4, in the case where the client has not been authenticated before the time 403, even when a third RTCP RR packet has been received before 60 seconds elapse from the last reception time retained in the retaining unit 104 for an RTCP RR packet (a second RTCP RR reception time), the communication session is not retained.

Then, the time 403 is set as a timeout time of the communication session with the client, the time 403 being the time at which 60 seconds, which are the timeout time period, elapse from the time at which the first RTSP command (the first GET_PARAMETER) has been received. In the example of FIG. 4, the first RTSP command is a command for which authentication of the client has succeeded when the first RTSP command is received by the server 100. In this manner, in the case where the client has not been authenticated by the server 100 in communication using RTSP, thereafter, the communication session with the client may be made not to continue in communication using RTCP.

In this manner, even in the case where the server 100 performs communication using the first communication procedure through which a client authentication function may be realized and using the second communication procedure through which the server 100 does not require client authentication, communication may be continued only with authenticated clients. Thus, more secure communication may be realized between the server 100 and clients.

In the first embodiment, even in the case where the client has not been authenticated in communication using RTSP, the communication session with the client is retained until the timeout time thereof. In this manner, even in the case where authentication of the client has failed once, when authentication is executed again and succeeds, the communication session may be retained.

Figure 6:
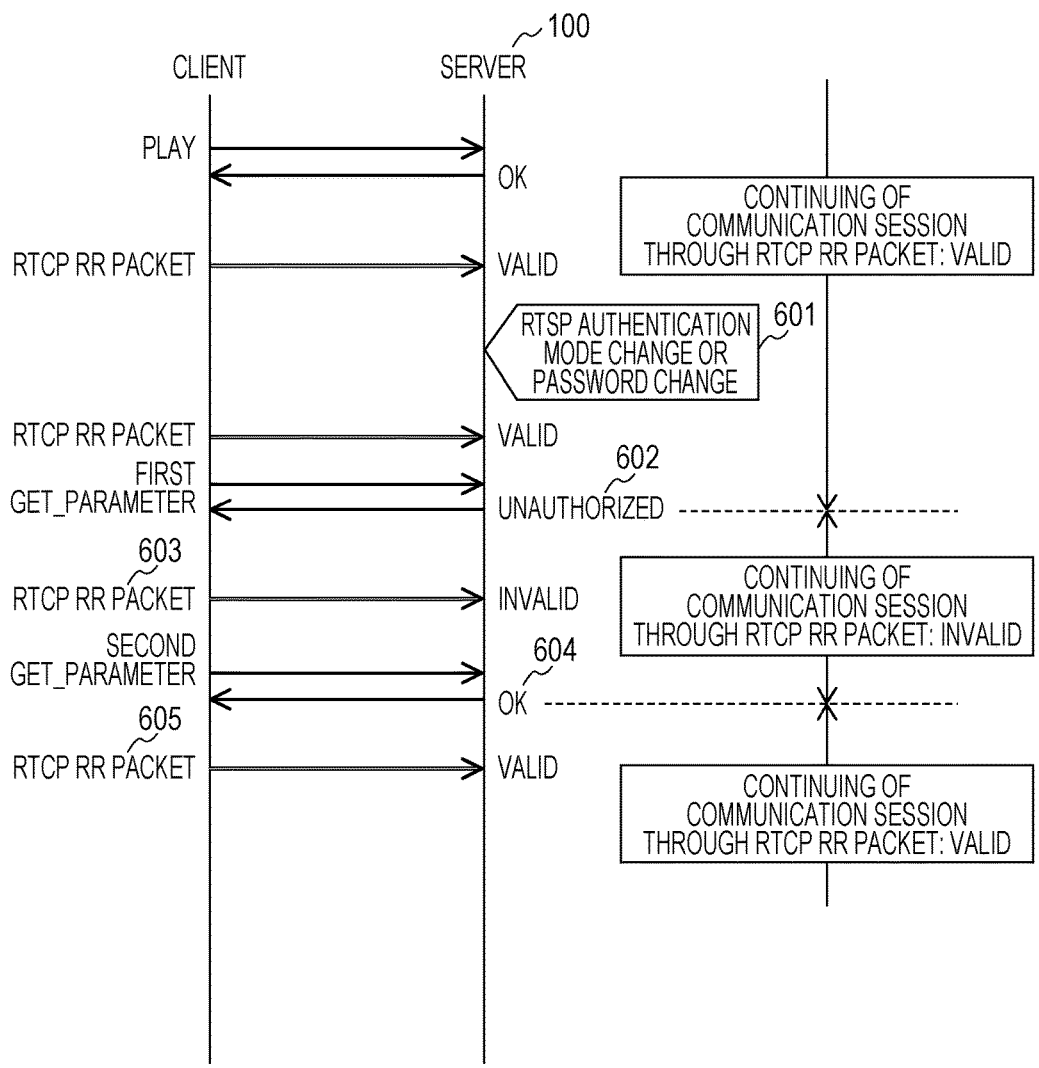
FIG. 6 is a sequence diagram illustrating an example of a process in the case where RTSP authentication has failed and then succeeded again in the server.

An example of a process in the case where RTSP authentication has failed and thereafter RTSP authentication has succeeded in the same communication session will be described using FIG. 6.

A time 601 is a time at which the RTSP authentication mode has been changed, the password has been changed, and the like in a client.

A command 602 is an error code indicating that the client is not authenticated by the server 100 because of the change made by the client at the time 601. The command 602 is transmitted from the server 100 to the client in response to reception of a first RTSP command.

When RTSP authentication of the client fails, the server 100 sets continuing of the communication session through an RTCP RR packet to invalid in the communication session, in a state in which RTSP authentication has failed. That is, since an RTCP RR packet denoted by 603 in FIG. 6 is a packet received in the state in which RTSP authentication has failed, reception of the RTCP RR packet denoted by 603 gives no reason for preventing the communication session from being terminated and the communication session is not continued. In FIG. 6, the communication session is continued until a session timeout time, which is the time 60 seconds after reception of the RTCP RR packet, the reception having been performed before RTSP authentication has failed.

After the RTSP authentication has failed, in the case where a second RTSP command has been received and RTSP authentication of the client has succeeded before the session timeout time, the server 100 transmits a command 604 to the client, the command 604 indicating that authentication of the client has succeeded.

When the command 604 is transmitted and thereafter, the server 100 changes the function for continuing the communication session to valid since the RTCP RR packet has been received. That is, an RTCP RR packet 605 is a packet received in a state in which RTSP authentication of the client has succeeded, and thus it is valid to continue the communication session through reception of the RTCP RR packet 605.

In this manner, a limit is put on retaining of a communication session with a client through the second communication procedure in a time period from a first time at which the client has not been authenticated as a certain client through the first communication procedure to a second time at which the client has been authenticated. Here, the first communication procedure may be RTSP and the second communication procedure may be RTCP. Then, control is performed under which retaining of a communication session with the client is allowed through the second communication procedure at and after the second time.

As a result, after authentication of a client performed by the server 100 has failed, in the case where the client has been authenticated by the server 100, the client may cause the function for continuing a communication session to be valid by transmitting an RTCP RR packet.

<Second Embodiment>

In the first embodiment, an example has been described in which in the case where a client has not been authenticated in communication using RTSP, even when the server 100 receives an RTCP RR packet thereafter, the server 100 does not continue a communication session with the client.

However, in the case where a client has not been authenticated, when an RTCP RR packet is received within a predetermined time period among RR packets received thereafter, the server 100 may continue a communication session with the client in response to reception of the RTCP RR packet.

In a second embodiment, in the case where a second RTCP RR packet has been received before a predetermined time period passes after reception of a first RTCP RR packet, even when RTSP authentication of the client fails in a time period from the reception time of the first RTCP RR packet to the reception time of the second RTCP RR packet, a communication session is continued in response to reception of the second RTCP RR packet.

Description of the configuration of a transmission apparatus in the second embodiment will be omitted since the description is the same as that made using FIG. 1 in the first embodiment.

An example of communication session control in the second embodiment will be described using FIG. 5.

Similarly to the description made using FIG. 4 in the first embodiment, the case will be described where the timeout time period for communication using RTSP and that for communication using RTCP are 60 seconds.

A time 503 is the time 60 seconds after reception of a first RTSP command (a first GET_PARAMETER).

A time 504 is the time 60 seconds after reception of a first RTCP RR packet. A time 505 is the time 60 seconds after the server has received a second RTCP RR packet, which is transmitted after the first RTCP RR packet. In addition, a time 506 is the time 60 seconds after the server has received a third RTCP RR packet, which is transmitted after the second RTCP RR packet.

Figure 5:
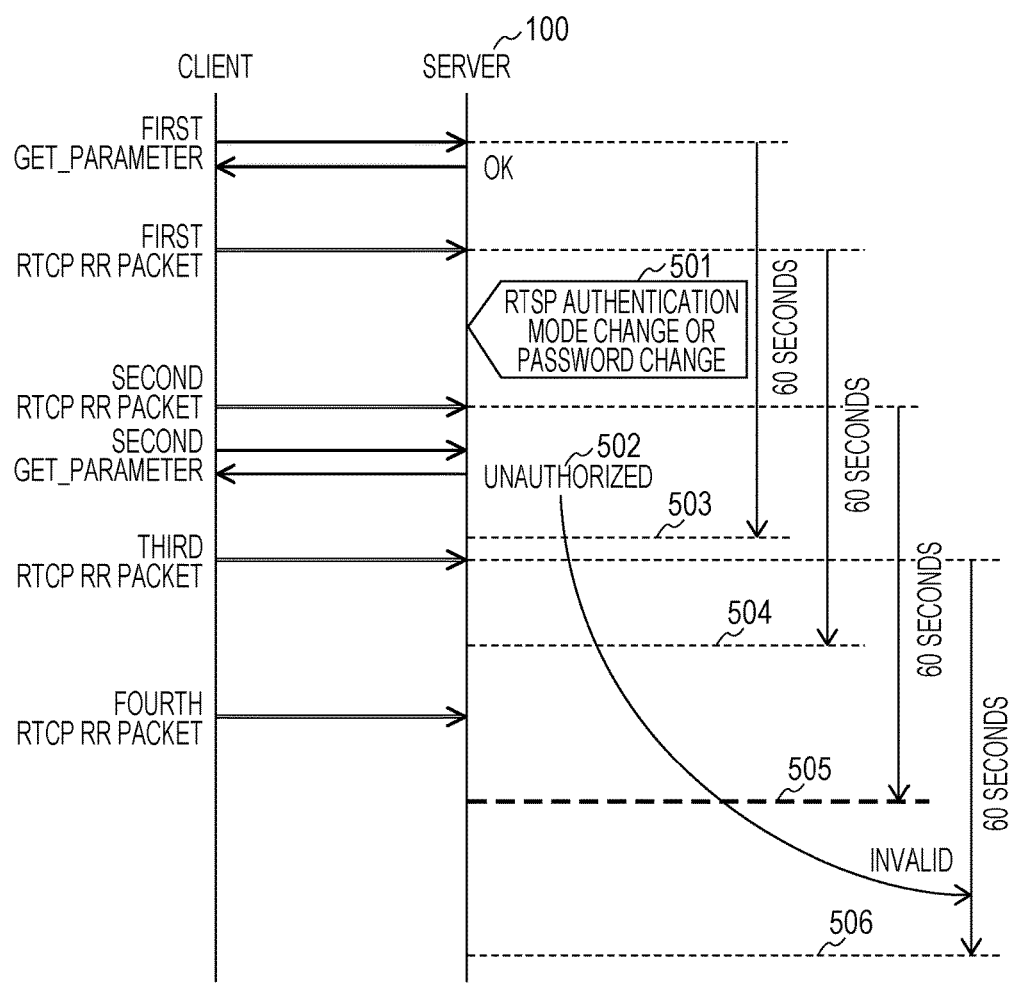
FIG. 5 is a sequence diagram illustrating an example of communication session control in a server according to a second embodiment.

In FIG. 5, a time 501 is a time at which a client has changed settings such as changing of the RTSP authentication mode and changing of the password in a time period from the reception time of the first RTSP command to the reception time of the second RTSP command.

At the time 501 of FIG. 5, for example, in the case where the RTSP authentication mode has been changed, the password has been changed, or the like, when authentication of the client executed in response to the second RTSP command fails, the server 100 returns an error code 502 indicating an authentication error.

Here, in the second embodiment, the case will be described where authentication of the client has failed after reception of the second RTCP RR packet and before reception of the third RTCP RR packet.

In the first embodiment, the case has been described where when the client is not authenticated, the third RTCP RR packet received thereafter does not cause the communication session to be continued. However, in the second embodiment, in the case where the third RTCP RR packet has been received before the predetermined timeout time period elapses from the reception time of the second RTCP RR packet, the server 100 determines to continue the communication session in response to reception of the third RTCP RR packet.

Then, even when a fourth RTCP RR packet is received before the predetermined timeout time period elapses from the reception time of the third RTCP RR packet, which has been received after authentication of the client has failed, the function for continuing the communication session in response to reception of the fourth RTCP RR packet is made invalid.

Even after such a process, in the case where the client has not been authenticated by the server 100 in communication using RTSP, thereafter, a communication session with the client may be prevented through communication using RTCP from being continued.

In this manner, even in the case where the server 100 performs communication using the first communication procedure through which a client authentication function may be realized and using the second communication procedure through which the server 100 does not require client authentication, communication may be continued only with authenticated clients. Thus, more secure communication may be realized between the server 100 and clients.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A video transmitting method for transmitting video data to a client device based on RTSP (Real Time Streaming Protocol) and RTCP (Real-time Transport Control Protocol), the method comprising:
   receiving an RTSP packet from the client device;
   executing authentication processing for the client device by using data contained in the RTSP packet from the client device;
   determining a session timeout regarding retaining a communication session with the client device using the RTSP based on both status of communication using the RTSP and status of communication using the RTCP in a case where the client device is successfully authenticated by executing the authentication processing, and determining the session timeout regarding retaining the communication session with the client device using the RTSP based on the status of communication using the RTSP and not based on the status of communication using the RTCP in a case where the client device is not successfully authenticated by executing the authentication processing; and
   transmitting the video data to the client device based on the communication session according to RTSP.

2. The method according to claim 1, wherein the RTCP packet includes information indicating a reception status of data transmitted to the client device, the RTCP packet being defined in RTCP specification.

3. The method according to claim 1, further comprising identifying an elapsed time period from a time at which an RTSP packet has been last received, wherein the communication session according to RTSP is terminated when the elapsed time period reaches a threshold during a predetermined time period later than a failure of the authentication processing for the client device.

4. The method according to claim 1, further comprising identifying an elapsed time period from a time at which an RTSP packet has been last received,
   wherein the communication session according to RTSP is terminated when the elapsed time period reaches a threshold,
   wherein the elapsed time period is reset in response to receiving the RTCP packet from the client device after the client device is authenticated based on the authentication processing for the client device, and
   wherein the elapsed time period is not reset in response to receiving of an RTCP packet from the client device during a time period later than a failure of the authentication processing for the client device.

5. The method according to claim 1, wherein the communication session according to RTSP is retained in a case where an RTSP packet is received from the client device during a time period later than a failure of the authentication processing for the client device.

6. The method according to claim 1, wherein the RTSP packet is a message from the client device to a server device that transmits video data, the RTSP packet being defined in RTSP specification.

7. A server device for transmitting video data to a client device based on RTSP (Real Time Streaming Protocol) and RTCP (Real-time Transport Control Protocol), the server device comprising:
   a communication unit configured to receive a plurality of packets including an RTCP packet and an RTSP packet; and
   a processing unit configured to execute authentication processing for the client device by using data contained in the RTSP packet from the client device and to determine a session timeout regarding retaining a communication session with the client device using the RTSP based on both status of communication using the RTSP and status of communication using the RTCP in a case where the client device is successfully authenticated by executing the authentication processing, and determine the session timeout regarding retaining the communication session with the client device using the RTSP based on the status of communication using the RTSP and not based on the status of communication using the RTCP in a case where the client device is not successfully authenticated by executing the authentication processing, wherein the communication unit transmits the video data to the client device based on the communication session according to RTSP.

8. The server device according to claim 7, wherein the processing unit identifies an elapsed time period from a time at which an RTSP packet has been last received, and wherein the communication session according to RTSP is terminated when the elapsed time period reaches a threshold during a predetermined time period later than a failure of the authentication processing for the client device.

9. The server device according to claim 7, wherein the processing unit identifies an elapsed time period from a time at which RTSP packet has been last received,
wherein the communication session according to RTSP is terminated when the elapsed time period reaches a threshold,
wherein the elapsed time period is reset in response to receiving the RTCP packet from the client device after the client device is authenticated based on the authentication processing for the client device, and
wherein the elapsed time period is not reset in response to receiving of RTCP packet from the client device during a time period later than a failure of the authentication processing for the client device.

10. A computer-readable storage medium storing a program for causing a computer to execute a video transmitting method for transmitting video data to a client device based on RTSP (Real Time Streaming Protocol) and RTCP (Real-time Transport Control Protocol), the method comprising:
receiving an RTSP packet from the client device;
executing authentication processing for the client device by using data contained in the RTSP packet from the client device;
determining a session timeout regarding retaining a communication session with the client device using the RTSP based on both status of communication using the RTSP and status of communication using the RTCP in a case where the client device is successfully authenticated by executing the authentication processing, and determining the session timeout regarding retaining the communication session with the client device using the RTSP based on the status of communication using the RTSP and not based on the status of communication using the RTCP in a case where the client device is not successfully authenticated by executing the authentication processing; and
transmitting the video data to the client device based on the communication session according to RTSP.

11. The medium according to claim 10, the method further comprising identifying an elapsed time period from a time at which an RTSP packet has been last received, wherein the communication session according to RTSP is terminated when the elapsed time period reaches a threshold during a predetermined time period later than a failure of the authentication processing for the client device.

12. The medium according to claim 10, the method further comprising identifying an elapsed time period from a time at which an RTSP packet has been last received,
wherein the communication session according to RTSP is terminated when the elapsed time period reaches a threshold,
wherein the elapsed time period is reset in response to receiving the RTCP packet from the client device after the client device is authenticated based on the authentication processing for the client device, and
wherein the elapsed time period is not reset in response to receiving of an RTCP packet from the client device during a time period later than a failure of the authentication processing for the client device.

* * * * *